Nov. 1, 1938.　　　J. E. LEONARD　　　2,135,309
ADJUSTABLE BROILER GRID
Filed April 15, 1935
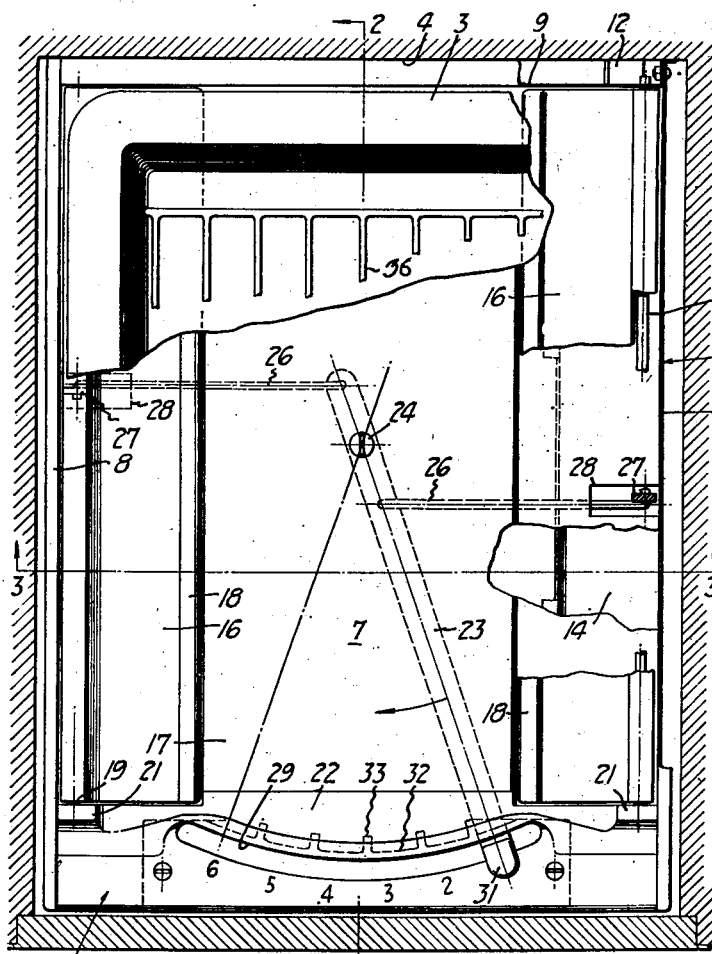
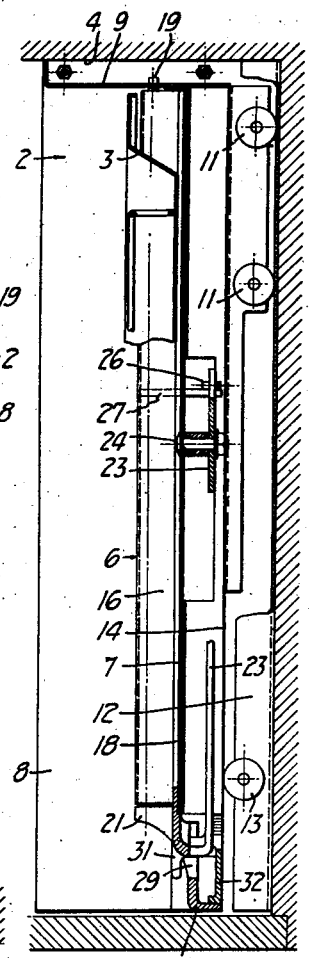
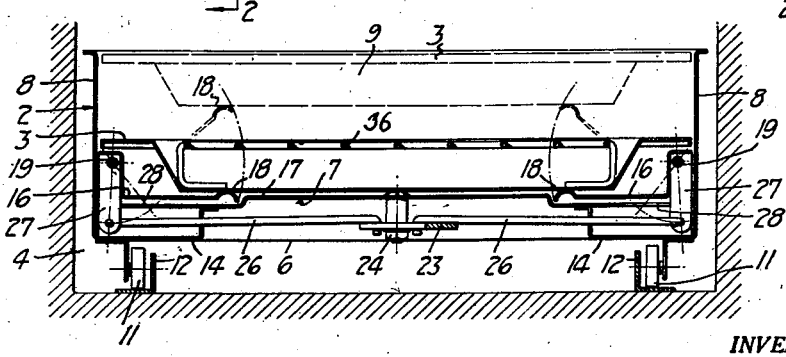
INVENTOR.
Joseph E. Leonard
BY Joseph B. Gardner
ATTORNEY Patented Nov. 1, 1938

2,135,309

UNITED STATES PATENT OFFICE 2,135,309

ADJUSTABLE BROILER GRID

Joseph E. Leonard, Berkeley, Calif., assignor to Hammer-Bray Company, Ltd., Oakland, Calif., a corporation of Nevada Application April 15, 1935, Serial No. 16,397

5 Claims. (Cl. 126—41)

REISSUED

JUL 1 6 1940

The invention relates to a means arranged for use in a broiler compartment of a range or stove for moving the broiler grid or pan to, and holding same in, different elevations in the compartment.

An object of the invention is to provide a means of the character described, which will be formed as a part of a drawer which is movable into and out of the broiler compartment and upon which the broiler grid or pan is carried.

Another object of the invention is to provide a means of the character described which requires no mutilation of or attachment to any of the stove members, yet is easily and conveniently operated by means which remains concealed except when the broiler compartment is opened.

A further object of the invention is to provide a means of the character described, in which the operative mechanism thereof is at all times concealed from view and fully shielded from the heat and cooking products in the compartment.

A still further object of the invention is to so design the device that when the grid and pan are removed from the broiler compartment, the portion of the device remaining in the compartment will be unobstrusive, easy to clean, and permit of the free use of practically the entire space in the compartment.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a horizontal sectional view taken through a stove broiler compartment equipped with the grid adjusting means of my invention.

Figure 2 is a sectional view taken at right angles to the view shown in Figure 1, the plane of the section being indicated by the line 2—2 in the latter figure.

Figure 3 is a vertical sectional view taken at right angles to Figure 2, the plane of the section being indicated by the line 3—3 of Figure 2.

Figure 4 is a detail vertical sectional view of a portion of the lever retaining rack used in the device.

In the embodiment of the invention here described, the means is designed for use in connection with a roller supported carrier 2 upon which the broiler pan 3 or other grid element is removably mounted for positioning in or out of the broiler compartment 4. The latter comprises a part of a stove or range and has disposed therein, but not herein shown, a burner or the like which is usually positioned in fixed relation near the top of the compartment.

The carrier 2, as here illustrated, includes a drawer like structure 6 formed with a bottom wall 7, side walls 8, and a rear wall 9, the front of the drawer structure being preferably left entirely open so that the pan may be moved into or out of the structure and access readily had to the pan if desired without removing the same from the compartment. Support of the carrier is by means of rollers 11 carried by the former and engaging guides or tracks 12 on the bottom of the compartment, and rollers 13 mounted on the tracks and engaged by strips 14 on the under side of the drawer structure 6.

Positioned within the structure 6 and preferably located adjacent the side walls 8, is a pair of movable rests 16 on which the pan 3 is arranged to be supported while on the carrier. The rests extend parallel to said walls, that is from the front to the rear of the structure, and are preferably in the form of strips or plates which may be caused to lie practically flat upon the bottom wall 7. Desirably the portions of the wall 7 underlying the rests 16 are depressed so that when the latter are caused to lie in the position aforesaid the rests will be coplanar with the portion 17 of the wall 7 therebetween, and form therewith a relatively smooth flat bottom on which the pan may be superimposed.

As will be clear from Figure 3, the pan is arranged to be supported on the beaded edges 18 of the rests, and the rests are so mounted that such edges may be raised or lowered to thereby move the pan when disposed thereon, to different elevations on the carrier. To afford the desired raising or lowering of the edges 18, the rests are pivotally connected to the drawer structure for movement about a horizontal axis parallel to the side walls, and as here shown such connection is made for each rest by means of a rod 19 fixed for movement with the associated rest and pivotally mounted at one end in the rear wall 9 and at the other end in an ear 21 formed on a frontal member 22 at the open end of the structure. The member 22 is secured to the bottom and side walls and incidentally provides a reinforcement for the structure. Each of the rods 19 is located immediately adjacent the side walls but above the depressed portion of the bottom wall, and desirably the portion of the rest at the rod is offset upwardly and formed to completely cover the rod. In the latter connection it will be noted that the offset occurs at the edge of the rest adjoining the side walls and since in the usual pan design the body portion is narrower than the top or flanged portion, the offsets will in no way interfere with the proper positioning of the pan upon the bottom wall of rests in any position of the latter.

To rotate the rests about their pivot axes, there is here shown provided a lever 23 conveniently fulcrumed to the bottom wall by a bolt 24 and connected by means of links 26 to crank arms 27 fixed to the rods, the links for the different rods as will be clear from Figure 1, being connected to the lever at opposite sides of the fulcrum bolt. The lever and links are all located on the under side of the bottom wall, while the arms extend from the links to the rods through slots 28 in such wall. Access to the lever so as to rotate the rests is afforded at the front of the structure where a portion of the lever extends through an arcuate slot 29 formed in the frame member 22. Desirably the exposed end of the lever is provided with a handle or knob 31 to facilitate operation thereof by the user.

Means are provided in association with the lever for releasably locking same in any one of a selective number of positions so as to thereby cause the rests and consequently the pan to be maintained at the desired elevation. As here shown, such means comprises a segmental rack 32 conveniently fixed to the frontal member on the under side thereof and having a series of spaced stops 33 lying in the horizontal path of movement of the lever. The lever is permitted a limited vertical movement and the stops 33 are so positioned that the lever will clear same when the lever is moved horizontally while in raised position. On the other hand, when the lever is released it will drop into position for engagement with the stops so that its horizontal movement will be limited. Preferably the faces of the stops, are inclined as shown in Figure 4 that due to the weight of the pan, the latter tends to move and hold the lever in locked engagement with the stops, and yet at the same time when the lever is moved to elevate the pan, the former will readily slide over the stops.

If desired, the member 22 may be marked to correspond with the stops in order that the operator may readily place the lever in a position required for placing the pan at a desired elevation on the carrier.

It will now be clear that practically all of the parts for effecting movement of the broiler grid and for maintaining same in desired position are, with the exception of the rests, disposed below the bottom of the drawer, are completely shielded from the interior of the compartment thereabove and particularly so when the rests are in their lowermost position and covering the slots 28. Furthermore, since the rests may be positioned to lie flat upon the bottom of the drawer, and in such position form a smooth and practically uninterrupted portion of such bottom, the task of cleaning the drawer is rendered simple and easy and at the same time no obstructions will be encountered by the pan when being moved into or out of the drawer. A grill 36 or the like may be placed in or upon the pan, and it will be understood that the term grid or pan, as herein used, is intended to cover any element upon which the article to be broiled is supported.

I claim:

1. In an adjustable grid for a broiler, a supporting unit arranged for positioning in said broiler and having a portion defining a horizontal partition for the broiler compartment, sectional wall portions providing a grid-rest at the side of said partition and mounted for pivotal movement from a position coplanar to said partition to a position elevated therefrom, mechanism positioned substantially exclusively on the under side of said partition and manually operable from the front of the unit to effect pivotal movement of the rests, and means to hold the rests selectively in different positions.

2. In an adjustable grid for a broiler, a supporting unit arranged for positioning in said broiler and having a portion defining a horizontal partition for the broiler compartment, grid-rests on the upper side of said partition pivoted to said unit for movement about horizontal axes at the side edges of said partition for movement to and from a position substantially coplanar with said partition, a pan arranged for positioning on said rests to engage an edge thereof, crank arms fixed to said rests for pivotal movement therewith and extending through slots in said partition, a lever carried by said unit and pivotally mounted on the under side of said partition and having one arm extended to the front of said unit, links connecting said lever and crank arms whereby on rocking of said lever said rests will be moved about their pivots to raise and lower said pan, and means for releasably locking said lever in different positions.

3. In an adjustable grid for a broiler, a drawer mounted for movement into and out of said broiler and having a portion defining a horizontal partition for the broiler compartment when the drawer is disposed therein, grid rests positioned on the upper side of said partition and mounted to swing about horizontal axes along the side edges of said partition for movement upwardly from and downwardly to a position substantially coplanar with said partition, a frame member extending across the front portion of said drawer and providing a substantial extension of said partition, said partition and said member having slots therein, mechanism carried by said unit for swinging said rests about their pivotal axes and including parts extending through the slots in said partition and connected to said rests, and a lever operatively connected with said parts and extending through the slot in said frame member to an exposed position at the front of said unit and being urged in one direction by the supported weight on said rests, and a plurality of stops selectively engageable by said lever for holding the latter against movement in said direction and to hold said rests in different positions and being of such form that the force of the lever thereagainst will hold the lever in locking engagement therewith.

4. In an adjustable grid for a broiler, a supporting unit arranged for positioning in said broiler and including a relatively fixed wall portion spaced inwardly from the sides of said unit, movable grid supporting wall portions located at the sides of said first portion and extending substantially coplanar and forming therewith in one position a horizontal partition substantially completely across the unit, and means operable from the front of the unit and positioned under said fixed portion for elevating said movable portions to raise the grid supported thereon.

5. In an adjustable grid for a broiler a supporting unit arranged for positioning in said broiler and including a relatively fixed horizontal wall section spaced inwardly from the sides of said unit, movable wall sections forming in one position substantially horizontal extensions of said first section, a grid having a central depressed portion resting on said movable sections and having raised side portions overlying and spaced from said movable sections, said movable sections being pivoted at points between said raised side portions and said fixed section and adjacent the sides of said unit, and means covered by said fixed and movable sections operative from the front of the unit for moving said sections about the pivots.

JOSEPH E. LEONARD.